United States Patent [19]

Rosdolsky et al.

[11] 3,974,326
[45] Aug. 10, 1976

[54] FACSIMILE COMMUNICATION SYSTEM
[75] Inventors: Hans G. Rosdolsky, Essen, Germany; Heinrich Meyr, Los Angeles, Calif.
[73] Assignee: Hasler AG, Bern, Switzerland
[22] Filed: Jan. 6, 1976
[21] Appl. No.: 646,901

Related U.S. Application Data
[63] Continuation-in-part of Ser. No. 474,597, May 30, 1974, abandoned.

[30] Foreign Application Priority Data
June 8, 1973 Switzerland.......................... 8423/73

[52] U.S. Cl................................ 178/6; 178/DIG. 3
[51] Int. Cl.²........................................... H04N 7/12
[58] Field of Search............................ 178/6, DIG. 3

[56] References Cited
UNITED STATES PATENTS
2,353,631 7/1944 Bliss..................................... 30/241
2,909,601 10/1959 Fleckenstein......................... 178/6.8
3,347,984 10/1967 Holmberg............................. 360/38
3,366,732 1/1972 Holmberg............................. 178/6.6

*Primary Examiner*—Robert L. Griffin
*Assistant Examiner*—Edward L. Coles
*Attorney, Agent, or Firm*—Brady, O'Boyle & Gates

[57] ABSTRACT

A black and white facsimile communication system wherein the document to be transmitted is scanned line by line, the scanner signals are sampled to obtain pulse sequences having a constant number of pulses for every line. The pulse sequences are converted into codewords for redundancy reduction. The codewords are transmitted and, in the receiver, reconverted into pulse sequences which control reproduction. Before reproduction every pulse sequence obtained by reconversion is tested whether it contains the correct number of pulses. If that is not the case, the last reproduced line is reproduced again instead of the line received with an error.

2 Claims, 12 Drawing Figures

FACSIMILE COMMUNICATION SYSTEM

CROSS-REFERENCE TO RELATED APPLICATION

This application is a continuation-in-part of our application Ser. No. 474,597, filed May 30, 1974, now abandoned, in the names of Hans G. Rosdolsky and Heinrich Meyr.

BACKGROUND OF THE INVENTION

The invention relates to a black and white facsimile system, wherein the document is scanned line by line, the scanner signals are sampled to obtain for every line a pulse sequence of a constant number of pulses. The pulse sequences are converted into codewords for redundancy reduction. The codewords are transmitted and, in the receiver, reconverted into pulse sequences which control reproduction.

Various methods are known for reducing redundancy, in particular those exploiting only line redundancy. One of these known arts is the so-called run-length coding, whereby the successive points of equal color are counted and codewords corresponding to these figures are transmitted and, in the receiver, reconverted into pulse sequences which control reproduction (e.g. Fleckenstein et al. U.S. Pat. No. 2,909,601). Such methods enable the transmission time to be shortened considerably, but are very prone to interference. A bit error in one line falsifies the rest of the line. With unfavorable errors this may result in very conspicuous black and/or white stripes.

Systems are known in which a video signal is delayed for one line period. Normally, the signal is reproduced without delay. However, during response of a drop-out sensor, the delayed signal is reproduced (Bliss, U.S. Pat. No. 2,535,631; Holmberg, U.S. Pat. Nos. 3,347,984 and 3,366,732).

SUMMARY OF THE INVENTION

It is an object of the present invention to circumvent by simple means the unsightly results of transmission errors. It is a more specific object of the invention to provide a facsimile communication system of the kind referred to in which every transmission error is detected even if the transmission of solely one pulse is disturbed.

In accordance with the invention every pulse sequence obtained by reconversion is tested whether it contains the correct number of pulses. This method is based on the fact that the number of the pulses of the pulse sequences of all lines before conversion and after reconversion are equal, if no transmission error of any kind occurred. If the reconverted pulse sequence has not the correct number of pulses, the just reproduced pulse sequence is reproduced once more instead of the erroneous pulse sequence.

The effectiveness of this method is owing to the fact that all normal pictures have a very high line sequence redundancy, in other words there is a high probability that successive lines will be similar. At the worst a horizontal edge of the pattern may be displaced by one line width but the black and/or white stripes mentioned are certainly avoided.

BRIEF DESCRIPTION OF THE DRAWINGS

A device embodying the invention will be described with reference to the following figures.

DESCRIPTION OF THE PREFERRED EMBODIMENT

Figure 1:
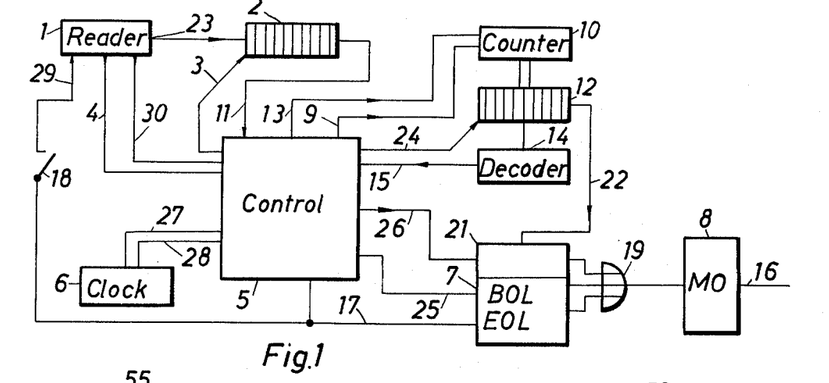
FIG. 1 is a schematic block diagram of a facsimile transmitter.

Referring to FIG. 1, 1 is a reader which scans the light values of a two-valued document, e.g. a document in black and white (not shown in FIG. 1), line by line by photo-electric means. The reader 1 has an input connected to line 29 and three outputs connected to line 4, 30 and 23 respectively. A pulse on line 29 causes the reader 1 to scan one document line and to stop thereafter. During scanning sampling control pulses, giving the point frequency of sampling, are generated and delivered to line 30. At the end of scanning of the document line, a signal "document line read" is generated and delivered to line 4. The signals representing the light values along the document lines are delivered through line 23 to the input of a first register 2 having also a control input connected to line 3 and an output connected to line 11 and delivering a sequence of a predetermined number of binary pulses for each document line. The reader 1 will be described later in detail, referring to FIG. 5.

Figure 6A:
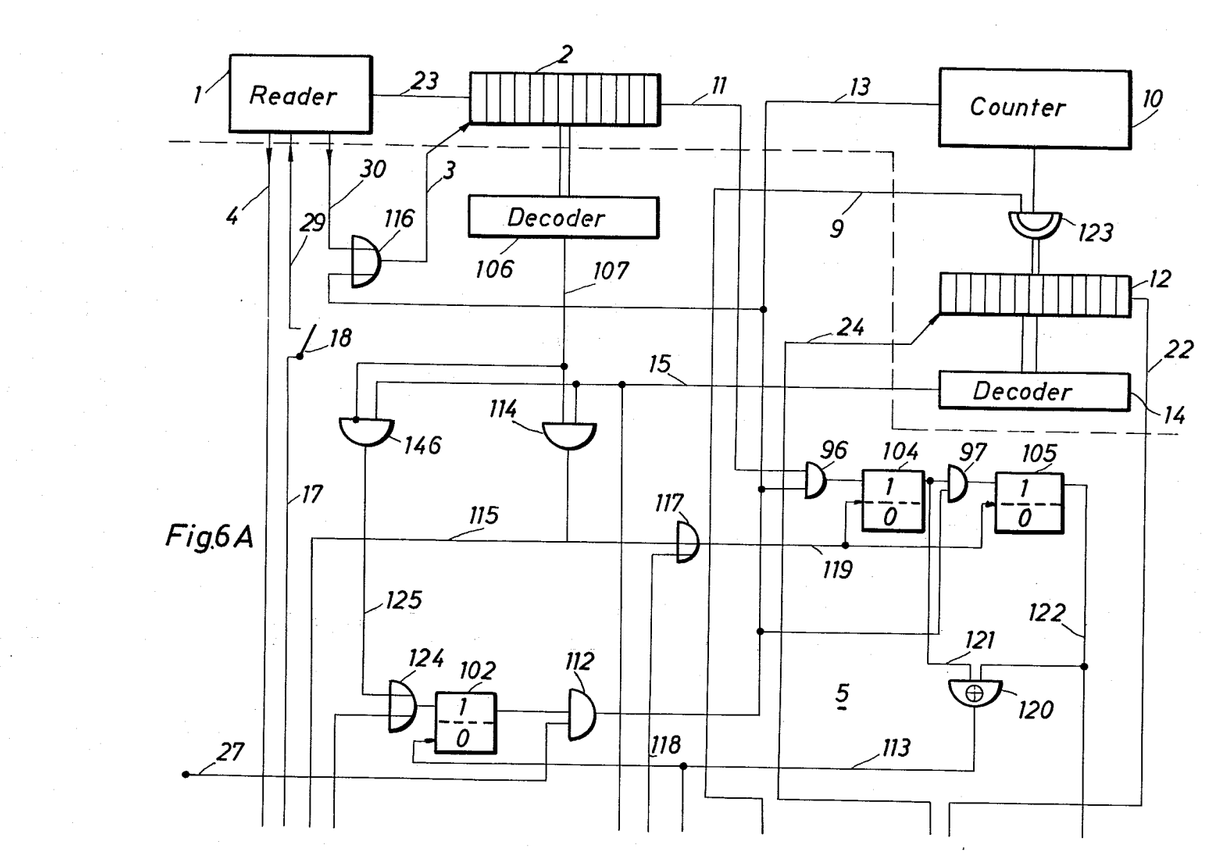
FIGS. 6a–6b, taken together as illustrated in FIG. 6c, are a schematic circuit diagram of the transmitter.
Figures 6B, 6C:
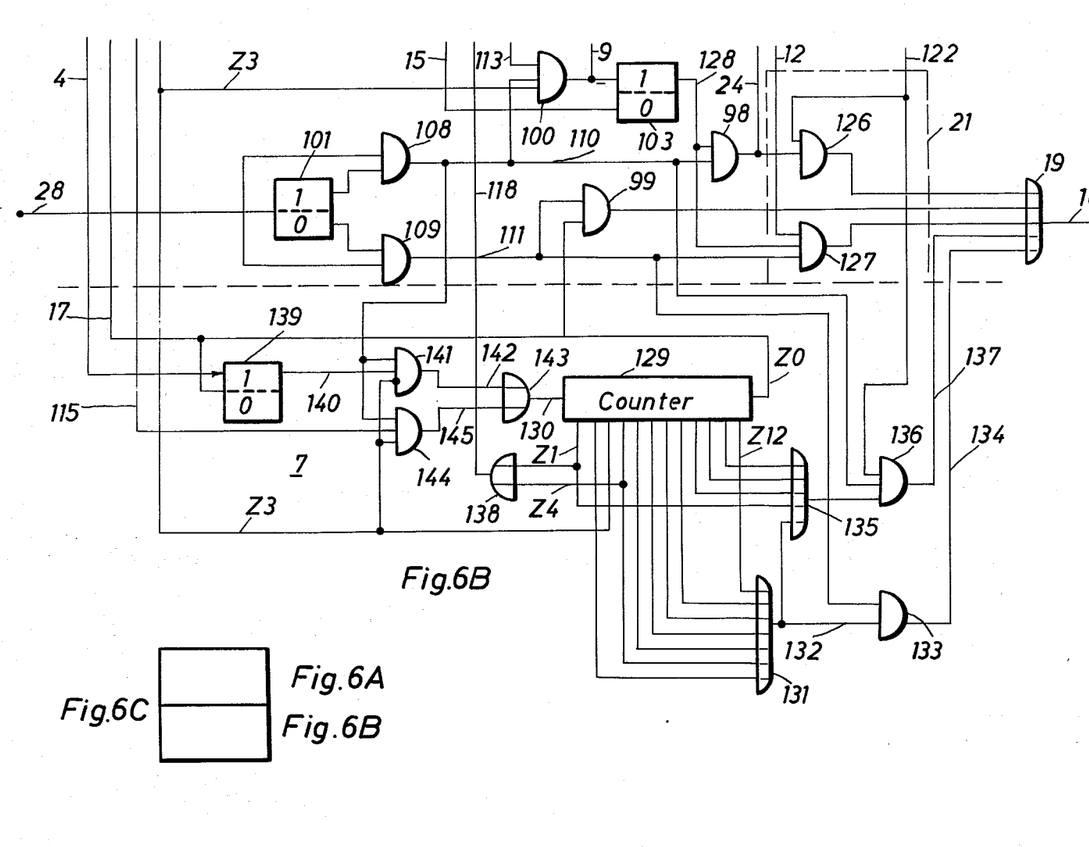

A transmitter control unit 5 controls line by line scanning of the document, coding said pulse sequences and transmission of the coded signals. The control unit 5 has inputs connected to line 4, 11, 15, 27, 28 and 30, respectively, outputs connected to line 9 and 13, respectively, and multiple pole outputs connected to lines 17, 25, and 26, respectively. The control unit 5 itself will be described later in detail, referring to FIG. 6.

A clock pulse generator 6 delivers a high frequency pulse stream through line 27 and a transmission frequency pulse stream through line 28 to the control unit 5.

A counter 10 has an input receiving through line 13 pulses derived in control unit 5 from the signals on line 23 and a control input connected to line 9. On reception of a pulse from line 9, the content of the counter 10 is transferred in parallel to a second shift register 12. Register 12 has a parallel output connected to a decoder 14, a serial output connected to line 22 and a control input connected to line 24 and receiving from control unit 5 pulses for shifting the register 12. Decoder 14 delivers a signal via line 15 to the control unit 5 when the second shift register 12 is empty.

A codeword output circuit 21 has an input connected to line 22, a control input connected to line 26 and an output connected to one of the inputs of an OR-gate 19. The codeword output circuit 21, under control of pulses from control unit 5, composes coded signals received from the series output of the second shift register 12 and delivers them to OR-gate 19.

A BOL (Begin of Line) and EOL (End of Line) codewords generator 7 has a BOL control input connected to line 25, and an EOL control input connected to line 17, a BOL output and an EOL output each connected to an input of OR-gate 19. A modulator 8 has an input connected to the output of the OR-gate 19 and an output connected to a transmission line 16.

The operation of the facsimile transmitter shown in FIG. 1 is as follows:

The reader 1 scans the two valued document, e.g. a document which is black and white, line by line and delivers to the first shift register 2 via line 23 for each document line a signal representing the light values along that document line. During scanning of each document line, as described in detail with reference to FIG. 5, the reader 1 produces and delivers to line 30 a predetermined number of sampling pulses, which is the same for each scanned document line, and at the end of each scanned document line, the reader 1 produces and delivers to the control unit 5 via line 4 a signal "document line scanned". The sampling pulses pass an OR-gate (116 in FIG. 6a) in the control unit 5 (described in detail with reference to FIG. 6a, 6b and 6c) and control shifting of the first shift register 2. Thereby, the signal representing the light values of a scanned document line is sampled and a sequence of a number of binary pulses equal to said predetermined number of sampling pulses is obtained and stored in the first shift register 2.

On a signal document line scanned from line 4, the control unit 5, shown in detail in FIG. 6a, 6b and 6c via a command on multiple line 25 (line 110, 118, 122 and 140 of FIG. 6a and 6b) causes the BOL and EOL codewords generator 7 to produce and deliver a BOL codeword via OR-gate 19 to modulator 8 for transmission of the BOL codeword through the transmission line 16, and then the control unit 5, by control pulses on line 3, causes the binary pulse sequence stored in register 2 to be read out via line 11 to the control unit 5. The length of each "run", i.e. the number of successive pulses of identical value — named "codeword" is counted by the counter 10, and if the control unit 5 detects a change of value between two successive pulses it causes, by a command on line 9 a transfer of the reading of the counter 10 (codeword) into the second register 12 and resets the counter 10 to zero. When the transmission of the BOL codeword has been completed, by commands on line 24 and multiple line 26, (111, 122 and 128 in FIG. 6) the codeword stored in the second register 12 is transferred via line 22 to the codeword output circuit 21 and OR-gate 19 to modulator 8 for transmission through transmission line 16. (It will be noted that circuit 21 adds further bits to each codeword as explained later.) The end of the transmission of a codeword from the second register 12 is detected by decoder 14, which then, by a command on line 15, to control unit 5 causes the next run to be counted and the corresponding codeword to be transmitted as described above. In this way, one codeword after the other is formed from the sampled signals representing the light values along one document line and is transmitted to transmission line 16. When the shift register 2 is empty, i.e. completely read out, a decoder (106, FIG. 6a) in the control unit 5 responds and unit 5 delivers a pulse to a line (107 in FIG. 6a) of multiple line 17 causing the BOL and EOL codewords generator 7 to generate and deliver an EOL codeword via OR-gate 19 to modulator 8 for transmission through transmission line 16 and simultaneously causes the reader 1 to scan the next document line.

Figure 2:
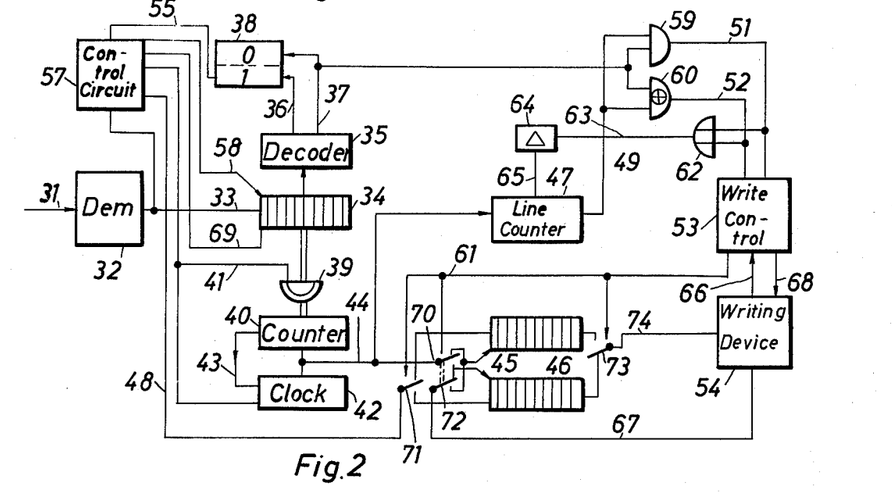
FIG. 2 is a schematic block diagram of a facsimile receiver.

FIG. 2 shows the receiver, which via line 31 is connected to the transmission line 16 of the transmitter. 32 is a demodulator with an output line 33. Connected to this is a control circuit 57, which contains a clock (151 in FIG. 7) synchronized by the incoming signals. Line 33 is also connected to the input of a shift register 34 whose shifting is controlled by pulses received on a line 58. Connected to the shift register 34 is a decoder 35, which gives a signal on a first output line 36 or on a second output 37 if the codeword BOL or EOL respectively is in the shift register. The inputs of a flip-flop 38 are connected to these two lines 36 and 37. The control circuit 57 will be described later in connection with FIG. 7. Via a gate group 39, the shift register 34 is connected with a down counter 40, whose count input is connected to the output of a clock 42. An output line 43 of counter 40, carrying a signal for the zero position of the counter, is connected to a stop input of the clock 42, whose start input is connected to an output line 41 of control circuit 57. 45 and 46 are two shift registers, whose capacities are equal to that of register 2 of the transmitter. 47 is a counter whose input is connected to an output line 44 of down counter 40 and whose output is connected to a line 49 and whose reset input is counted via a line 65 to a delay circuit 64. When the state of counter 47 reaches its final position, which corresponds to the number of pulses of a pulse sequence, it gives a signal on its output line 49 to inputs of an AND-gate 59 and an EXCLUSIVE-OR-gate 60. The other inputs of these gates are connected to the second output line 37 of decoder 35.

Four two position switches 70, 71, 72, 73 are coupled together. In the position shown, the switch 70 connects line 44 to the shift input register 45, switch 71 connects an output line 48 of control circuit 57 to the data input of register 45, switch 72 connects an output line 67 of a writing device 54 to the shift input of register 46, and switch 73 connects an input line 74 of the writing device 54 to the output of register 46. In the other switch position these connections are changed from one to the other of register 45 and 46.

A write control circuit 53 controls the read-out from one of the shift registers 45 and 46 into the writing device 54 and the recording of the bit sequences contained in the shift register onto the recording sheet of the writing device. The writing control circuit 53 has the following inputs: Line 51 (no error) from gate 59, line 52 (error) from gate 60, line 66 (rest position) from the writing device 54; and the following outputs: control of the switch 70, 71, 72, 73 by line 61, start of the writing device by line 68.

Lines 51 and 52 are connected to the reset input of counter 47 via an OR-gate 62, a line 63, the delay circuit 64 and the line 65.

The receiver functions as follows: The incoming pulse train transmitted synchronously is read into the shift register 34. Each document line starts with the BOL signal, which triggers an impulse on line 36 and sets the flip-flop 38. Via line 55 this gives control unit 57 the signal that the first codeword of a document line is beginning. This codeword is read into the shift register 34. When the control unit 57 detects the end of the codeword, it sends out a pulse on line 41, which transmits the codeword from the shift register 34 via the multiple gate 39 to the counter 40, and starts the clock 42. After a short delay, a signal is generated on line 69 which signal resets the shift register 34. The clock 42 sends out pulses on line 44, which advance one of the two shift registers 45 and 46 and at the same time make the counter 40 count down and counter 47 counts up one step for each pulse. When the counter comes down to 0, the clock 42 is stopped by a signal on line 43. At this moment the relevant shift register 45 or 46 respectively has as many ones or zeros written in as the counter reading had at the beginning of writing-in. Whether ones or zeros are written in, depends on the status of line 48. In this way the code words of a line are processed one after the other and put into one of the two shift registers 45 and 46. The clock frequency on line 44 is so high that the down-counting is terminated before the next codeword has been transmitted.

At the end of the document line the codeword EOL is transmitted and identified in the decoder 35. At the same time the counter 47 gives an output signal on line 49. If this signal coincides with the signal on line 37, this means that the number of picture points obtained from the sum of all codewords received is correct, and a signal is sent via line 51 to the write control 53. This switches the shift register 45, which has just been filled, over to transmission to the writing device 54, and effects the transmission. The writing device 54 is normally at rest and emits a signal on line 66. On a signal on line 68 it starts and writes on one line black or white according to the state of the line 74 which receives the signal from the output of either one of the shift registers 45 and 46 via switch 73. During the writing it emits on line 67 a number of pulses equal to the number of bits stored in the shift registers 45 or 46. If the EOL signal on line 37 and the output signal of counter 47 on line 49 do not coincide the EXCLUSIVE-OR-gate 60 sends out a signal on line 52; the switches 70 . . . 73 are not reversed by the write control 53. The next document line is written into the same shift register as the faulty document line just written in and replaces it. The other shift register, whose contents have not been destroyed by the read out, still contains the picture points of the previous document line and remains connected to the writing device 54. Its contents are plotted once again after first advancing the document sheet, so that two absolutely identical document lines appear one above the other.

Figure 3:
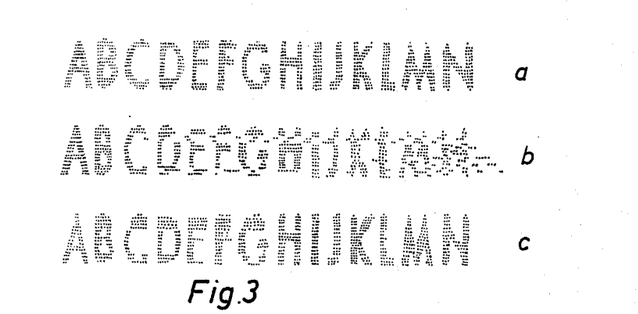
FIGS. 3a–3c are diagrammatic views showing parts of a transmitted document illustrating the effectiveness of the method.

The effect of the procedure described is shown in FIGS. 3a, 3b and 3c. A faultlessly transmitted row of letters is shown in FIG. 3a, taking fifteen scanning lines. FIG. 3b shows the picture by the run-length, coding procedure with a fault on six scanning lines, namely on the 4th, 5th, 7th, 10th, 12th and 14th lines. This picture must be regarded as useless. FIG. 3c shows the same transmission faults, but this time each defective line has been replaced by the preceding line. It will be seen that despite the high error rate the picture is quite usable, even though the 3rd line has been repeated twice over.

Now the code used for transmission will be explained with the aid of FIG. 4. The transmission is made in the form of dibits, i.e. groups of two bits. The first bit of every dibit is called the color bit, the second the information bit. If in a codeword the color bit may be zero or one, it will be indicated by the letter $c$. The transmitter at stand-by transmits a sequence of dibits $c1c1c1$ . . . The transmission of every document line begins with a signal BOL (begin of line) $c0c1$. One codeword is transmitted for every run, the codeword length depends on the length of the run. The color bits of the word correspond to the color of the run (0 for white, 1 for black) while the information bits taken together form the binary number indicating the run length. In this way the end of a codeword is easily recognized by a change of the color bit.

The transmission of a line is terminated by the codeword EOL (end of line) $c1c1c1c1c0c0c01$. This codeword cannot be formed by run length coding because the binary number is superior to the number of points of a document line. Between EOL and the next BOL filling dibits $c1c1c1$ . . . may be transmitted.

Figure 4:
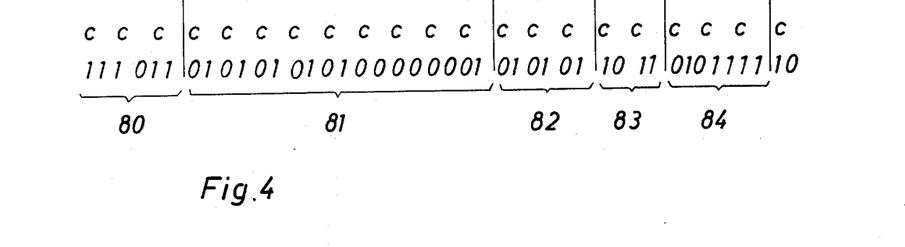
FIG. 4 is a schematic representation of the transmitted signals.

In FIG. 4, 80 denotes bits of the last run of a document line. The run is black, as indicated by color bits 1. The end of the run is indicated by a color bit change at the beginning of the EOL signal 81. After the end of the EOL signal, three filling dibits 01 follow, denoted by 82. The following BOL signal 83 is recognized by the sequence 01 of the information bits. The codeword 84 of the first run follows. It is a white run (color bit 0). Its length is equal to seven bits, if straight binary coding is used.

Figure 5:
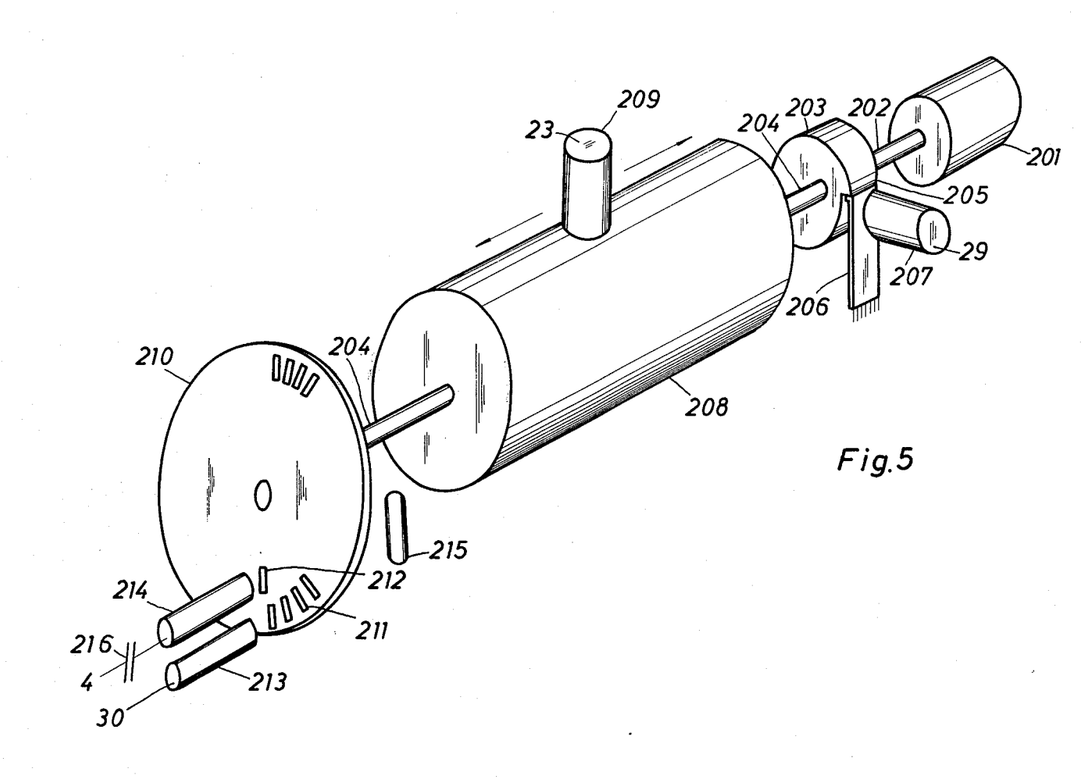
FIG. 5 is a schematic perspective representation of the reading and writing device.

FIG. 5 is a schematic view of the reader (1 in FIG. 1). 201 is an electric motor with a continually rotating axle 202. 203 is a disk containing a friction clutch (not shown) between an axle 204 and the axle 202. The disk 203 is solidary to axle 204 and has a nose 205 which is stopped by a movable blade 206 forming the armature of an electromagnet 207. When this magnet is energized, it attracts its armature 206 and thereby liberates the disk 203, so that it makes one turn if the electromagnet 207 is energized for a short time. On the axle 204 a cylinder 208 is fixed adapted to bear a two-valued (e.g. black and white) document to be transmitted. This document is scanned by means of a photo-electric device 209 movable in the direction of the axle and is automatically advanced one linewidth for every turn. On the axle 204 is also a disk 210 bearing on one radius a certain number of slots 211 and on another radius, a single slot 212. In face alignment with the slots 211 is a further photo-electric device 213, connected to the output line 30, while in face registration with and at the radial position of the single slot 212 is another photo-electric device 214, connected to the output 4 via a differentiating device 216, so that on line 4 a signal ("document line read") appears when the disk is going to its rest position. On the other side of the disk is a lamp 215 illuminating the two slot radial positions.

For the writing device (54 in FIG. 2) the same representation is valid if the photo-electric 209 device is replaced by a controllable light-source and lines 23, 4, 30 and 29 are numbered 74, 66, 67 and 68 respectively and if on the cylinder 208 a light-sensitive material is fixed. In another embodiment, the cylinder rotates continuously. The start signal only causes the advance of the electro-optical reader or the light-source for one line and the control circuitry is adapted to this kind of operation.

FIGS. 6a, 6b and 7 and 8 show the control circuitry of the transmitter and receivers in detail. The circuits shown are composed mainly of flip-flops, gates and delay circuits. The flip-flops shown have their inputs on the left-hand side and their outputs on the right-hand side. They are of the RS-type. State 1 on the upper input sets the flip-flop, state 1 on the lower input resets it. A change on the middle input from 0 to 1 changes the state of the flip-flop. In the reset state the upper output is on zero and the lower one on 1, and vice versa for the set state. The gates such as gate 114 are AND-gates whose output is on 1 if all inputs are on 1. A point at the input of an AND-gate denotes an INHIBIT-input. The gates such as gate 116 are OR-gates, whose output is on 1, if anyone input is on 1. Such gates as gate 120 are EXCLUSIVE-OR-gates, i.e. circuits, which generate a short pulse when the states of its two inputs become different.

FIGS. 6a and 6b taken together as in FIG. 6c show a detailed circuit diagram of the transmitter control unit 5, the codeword output circuit 21, and the BOL and EOL codeword generator 7 of FIG. 1 as well as an indication of some of the connected circuit blocks for convenience.

The transmitter control unit 5 contains flip-flops 101 (Color), 102 (Count Run), 103 (Transmit Run Length Codeword), 104 and 105 (Color Change Detector) the latter two forming, together with the AND-gates 96 and 97, a shift register whose input is connected to the output of shift register 2 via line 11. 106 is a decoder, whose input is connected to the parallel output of the first shift register 2 and whose output is connected to line 107 and delivers a signal when register 2 is empty. The control unit 5 further contains AND-gates 108, 109, each one connected to the input and to one of the outputs of flip-flop 101, their outputs being connected to lines 110 and 111 respectively. An AND-gate 112 has two inputs, one of them receiving the high-frequency clock pulses on line 27, the other being connected to the set output of flip-flop 102, and one output is connected to line 13, 100 is an AND-gate whose output is connected to line 9 and whose inputs are connected to lines 110, 113, and line Z3. An AND-gate 114 has two inputs connected to lines 107 and 15 respectively and one output connected to line 115. An AND-gate 98 has inputs from the set output of flip-flop 103 via line 128 and from line 110, its output leading to a line 24. An AND-gate 99 has its inputs connected to lines 111 and Z0, its output to one input of OR-gate 19. An OR-gate 116 has its inputs connected to lines 13 and 30 and its output to line 3, which transmits the shift pulses for shift register 2. Another OR-gate 117 has its inputs connected to line 115 and to a line 118, its output to line 119. This line carries the shift pulses to the shift inputs of the flip-flops 104 and 105. 120 Is an EXCLUSIVE-OR-gate whose inputs receive signals via line 121 and 122 from the set outputs of flip-flops 104 and 105. Therefore a signal appears on its output connected to line 113, when the two flip-flops 104 and 105 go to different positions. This line 113 is connected to the reset input of flip-flop 102 and to an input of AND-gate 100. 124 is an OR-gate, whose output leads to the set input of flip-flop 102, and whose inputs are connected to lines Z3 and to a line 125 respectively. 146 is an INHIBIT-AND-gate, with its AND-input connected to line 15, its INHIBIT-input connected to line 107 and its output to line 125.

The codeword output circuit 21 contains two AND-gates 126 and 127, whose outputs are connected to inputs of OR-gate 19. The first AND-gate serves for transmitting color bits, the other one information bits. The inputs of the gate 126 are connected to a line 24 and to the line 122. The inputs of the gate 127 are connected to the lines 22, 111 and 128.

The BOL and EOL codewords generator 7 contains a counter 129 "modulo 13", whose count input is connected to line 130 and which has thirteen outputs, the first, second, fourth, fifth and last are numbered Z0, Z1, Z3, Z4 and Z12 respectively. The output signal of this counter 129 changes from one output to the next on reception of a count pulse on a line 130. Selected ones of these outputs go to the OR-gate 131, which generates the information bits of EOL and BOL signals and transmits them via line 132, AND-gate 133 and line 134 to an input of OR-gate 19. Line 132 as well as selected ones of the counter 129 outputs form the inputs of an OR-gate 135, which generates the color bits for the BOL and EOL signals and transmits them via AND-gate 136 and line 137 to another input of OR-gate 19. The counter outputs Z1 and Z4 are connected to the inputs of an OR-gate 138 whose output is connected to line 118. The BOL-EOL codewords generator 7 further contains a flip-flop 139 (Line Read) whose set input is connected to line 4, whose switching input is connected to line Z0 and whose set output is connected to line 140. This line leads to an AND-input of an INHIBIT-AND-gate 141, whose other AND-input is connected to line 110 and whose INHIBIT-input to line Z3. Its output 142 leads to the input line 130 of counter 129 via an OR-gate 143. A further AND-gate 144 has one input connected to line 110, a second one to line 115 and a third one to line Z3. Its output leads via line 145 to another input of OR-gate 143.

The circuit of FIG. 6a and 6b operates as follows:

By switching on the circuit all flip-flops, registers and counters are reset. When switch 18 is closed the signal coming from Z0 starts the scanning of the first document line. The signal representing the light values along the scanned line comes on line 23 and the predetermined number of clock pulses on line 30 via gate 116 and line 3 to the shift register 2. A sequence of Zeros and Ones corresponding to white and black points of the scanned line is read in in shift register 2. As soon as the document line is scanned, a signal appears on line 4 and sets flip-flop 139 thereby enabling gate 141. The clock pulses arriving on line 28 continuously switch flip-flop 101; color clock pulses appear on line 110 alternating with information clock pulses on line 111. The former ones pass the gates 141 and 143 and shift counter 129 to 1. A signal appears on line Z1, which, via gate 138, line 25 and 117 changes the states of flip-flops 104 and 105. The color bit corresponding to the new state of flip-flop 105 is sent out via gate 136, but the information bit is zero. The next color clock pulse shifts counter 129 to position 2. An information bit and a color bit appear on line 137 if flip-flop 105 is set. Thus, the BOL signal is transmitted. The next color clock bit switches counter 129 to position 3, which blocks gate 141 and enables gate 144. Now reading out of register 2 begins. Z3 sets flip-flop 102 which enables gate 112. The high frequency clock pulses from line 27 go via gates 112 and 116 to the shift register 2 and advance this shift register one step for every pulse. Further they are counted in counter 10 and they advance the two-stage shift register composed of flip-flops 104 and 105. As soon as the pulses on line 11 change, which indicates a change of the color and thus the end of the run a signal appears on line 9 at the output of gate 120, which causes the transfer of the contents of the counter 10 to shift register 12 via the gate group 123 and resets flip-flop 102, thereby stopping further counting, and sets flip-flop 103 via gate 100, which, via line 128 enables gates 98 and 127. The color pulses on line 110 pass gate 98 and, via line 24 advance register 12 one step for every pulse and control the transmission of color pulses depending on the state of flip-flop 105. Via line 22 and gate 127 the information pulses composing the binary number indicating the run length area read out of shift register 12 under control of the information pulses. When shift register 12 is empty this is detected by decoder 14, whose output pulse on line 15 resets flip-flop 103. This stops the dibit transmission and, as long as shift register 2 is not empty, via the INHIBIT-gate 126, line 125, and OR-gate 124 again sets flip-flop 102. In this way one run after the other is counted and the run-length indications transmitted as codewords. As soon as the last run is transmitted and the registers 2 and 12 are empty a signal is transmitted by gate 114 via line 115, which changes the state of flip-flops 104 and 105 and enables gate 144, so that the next color pulses advances counter 129 one step to position 4. From thereon the color clock pulses can again pass gate 141 until position 12 is attained and at each position one dibit of the EOL-codeword is generated in the same manner as described for the BOL-codeword. The color bits of the EOL-codeword are different from those of the last run, because Z4 has changed the states of flip-flop 105 via gates 138 and 117. As soon as ZO appears, flip-flop 139 is reset and the filling digits are transmitted with the aid of AND-gate 99. ZO starts again reader 1 via input 17.

Figure 7:
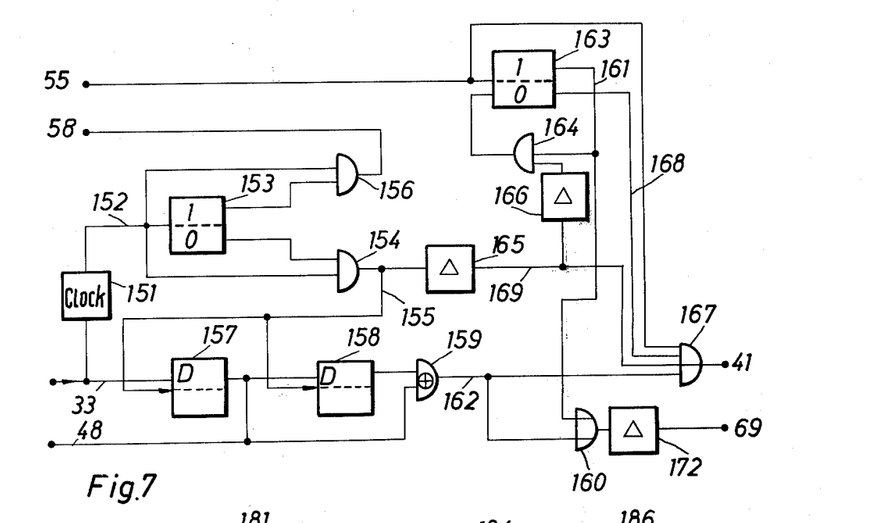
FIG. 7 is a schematic circuit diagram of the receiver control unit.

A detailed circuit of the receiver control circuit 57 is represented in FIG. 7.

The output line 33 of the demodulator 32 (FIG. 2) is connected to the input of a clock pulse generator 151, which produces one clock pulse on line 152 for every bit of the incoming signal. This line 152 is connected to the shift input of a flip-flop 153 which, together with two AND-gates 154 and 156 corresponds to the flip-flop 101 and gates 108 and 109 in the control circuit, FIG. 6b and delivers color clock pulses on a line 155 and information clock pulses on line 58. As already said in connection with FIG. 2, these pulses serve as shift pulses for shift register 34. The line 33 is also connected to the input of a two-stage shift register composed of flip-flops 157 and 158. Each of the flip-flops 157 and 158 is of the D-type and upon a clock signal on line 155 is set to the state corresponding to its input state. The two inputs of an EXCLUSIVE-OR-gate 159 are connected to the outputs of the flip-flops 157 and 158. Line 155 is connected via two delay circuits 165 and 166 to the input of an AND-gate 164. The other input of this gate is connected via a line 161 with a set output of a flip-flop 163 and its output with the reset input of the same flip-flop. The inputs of an AND-gate 167 are connected to the line 55, to the reset output of flip-flop 163 via a line 168, to a line 169 connecting the two delay circuits 165 and 166, and to the output of the EXCLUSIVE-OR-gate 159 via a line 162. The output of gate 167 is connected to line 41 leading to the gate group 39 and the clock 42. An OR-gate 160 has its inputs connected to lines 161 and 162, its output to line 69 via a delay circuit 172.

The operation of the circuit of FIG. 7 is as follows:

at the beginning all the flip-flops including flip-flop 38 (FIG. 2) are in the reset state. The color clock pulse read the color bits into the shift registers 157 and 158, the information clock pulses read the information bits into shift register 34. When the color changes, a color change pulse appears on line 162. As soon as the BOL-codeword is detected, line 55 changes from 0 to 1 and flip-flop 163 is set. This blocks gate 167 and the next pulse on line 169 cannot pass it and only resets flip-flop 163. This blocks the transfer of the signal BOL from shift register 34 to the counter 40 (FIG. 2).

During the transmission of the codewords of a document line the combination 01 equal to that of BOL signal has no effect on flip-flop 38 because it is already set. After the appearance of the BOL signal AND-gate 167 is blocked by its input 55.

Figure 8:
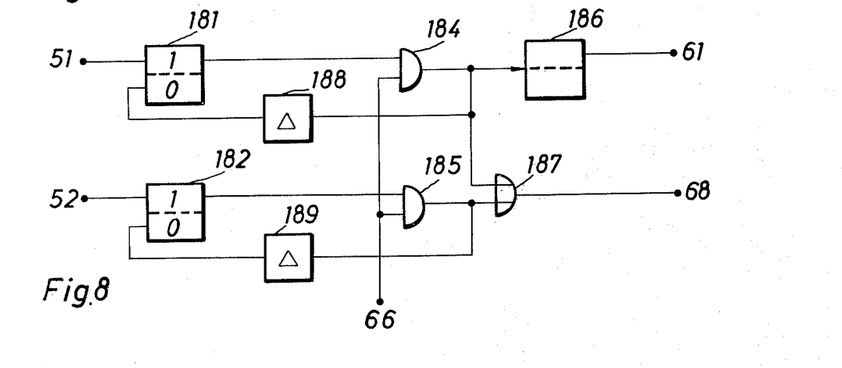
FIG. 8 is a schematic circuit diagram of the receiver writing control circuit.

FIG. 8 shows the detailed circuit diagram of the writing control circuit 53. The set inputs of two flip-flops 181 and 182 are connected to the lines 151 and 152 respectively. One input of each of two AND-gates 184 and 185 is connected to the set output of the flip-flop 181 and 182 respectively, while the other inputs are connected to the line 66. The output of gate 184 goes to the shift input of a flip-flop 186 and to an input of an OR-gate 187 having its other input connected to the output of the AND-gate 185. The output of OR-gate 187 is connected to the line 68. The output of gate 184 is connected to the reset input of flip-flop 181 via a delay circuit 188, the output of gate 185 via a delay circuit 189 to the reset input of flip-flop 182.

The circuit of FIG. 8 operates as follows:

When a signal appears on line 51 (No error) flip-flop 181 is set. If the previous document line has already been recorded, gate 184 is enabled by line 66 and flip-flop 186 changes its state. Via switch control line 61 the four switches 70, 71, 72 and 73 are operated and the functions of the two registers 45 and 46 are exchanged (FIG. 2). Simultaneously, via OR-gate 187 a signal is given on line 68, which starts the recording of the next document line and, via delay circuit 188, flip-flop 181 is reset.

When a signal appears on line 52 (Error) flip-flop 182 is set, which causes a start signal on line 68 via gates 185 and 187, but no change of the state of flip-flop 186. Flip-flop 182 is reset via delay circuit 189.

In the circuitry described the various operations are effected one after the other. Of course, more than one operation can be executed simultaneously with the aim to have no interruptions in transmission. This requires more storage capacity and more complex control circuitry but has no influence on the invention.

The terms and expressions which have been employed herein are used as terms of description and not of limitation, and there is no intention, in the use of such terms and expressions, of excluding any equivalents of the features shown and described or portions thereof but is is recognized that various modifications are possible within the scope of the invention claimed.

We claim:

1. A facsimile communication system transmitting signals representative of the light values of a two-valued document comprising:
  a transmitter (FIG. 1), having
  a reader (1) for scanning said document line by line and having an output (23) delivering signals representing the light values along the scanned lines;
  sampling means (2) for sampling said signals and obtaining a sequence of a predetermined number of binary pulses for each line, and having an input connected to the output (23) of said reader (1) and an output (11) delivering said pulse sequences;
  a converter (10, 12, 14) for converting said pulse sequences into codewords;
  means (7) for generating End-of-Line signals, and for transmitting for each line the codewords of the line and an End-of-Line signal;
  a receiver (FIG. 2) having an input (31);

a reconverter (34, 40, 42) for reconverting the received codewords and having an output (44) delivering reconverted pulse sequences;

a first and second register (45, 46) each having an input and an output and a storing capacity corresponding to said pulse sequence;

a decoder (35) responsive to said End-of-Line signals and having an output (37);

a first control circuit (57) connected to said receive input (31) and to said output (37) of said decoder (35) and controlling said reconverter (34, 40, 42) to deliver a reconverted pulse sequence for each line;

switching means (70, 71, 72, 73) having an input connected to the output (44) of said reconverter (34, 40, 42) and having a first and a second switching position and connecting in said first switching position and output (44) of said reconverter (34, 40, 42) to the input of said first register (45) and simultaneously the output of said second register (46) to an output (74) of said switching means (70, 71, 72, 73), and connecting in said second position the output (44) of said reconverter (34, 40, 42) to the input of said second register (46) and simultaneously the output of the first register (45) to the output (74) of said switching means (70, 71, 72, 73);

writing means (54) for two values tracing on a reproducing field line by line and having a first input connected to the output (74) of said switching means (70, 71, 72, 73) and receiving said pulse sequences for controlling the tracing value along each line, and a second input (68) for signals starting each line tracing;

an error detector (47, 59, 60) including a counter (47) connected to the output (44) of said reconverter (34, 40, 42) and counting the number of pulses of each pulse sequence and means (59) having an output (51) delivering a no-error signal if the counted number of pulses is equal to said predetermined number of pulses and means (60) having an output (52) delivering an error signal if the counted number of pulses differs from said predetermined number of pulses, and a second control circuit (53) connected to said outputs (51, 52) of said no-error and error signals delivering means (59, 60) and to said switching means (70, 71, 72, 73), for changing in response to said no-error signal said switching means (70, 71, 72, 73) from one to the other of said first and second position and having an output connected to said second input (68) of said writing means (54) and delivering a signal on each of said no-error and error signals.

2. A facsimile communication system according to claim 1 in which said transmitter (FIG. 1) includes means (7) for generating and transmitting a Begin-of-Line signal immediately before the transmission of the codewords of the line, and the receiver (FIG. 2) having a decoder (35) responsive to said Begin-of-Line signals and having an output (36) connected to said first control circuit (57).

* * * * *